United States Patent [19]

Rossetti

[11] Patent Number: 5,716,472
[45] Date of Patent: Feb. 10, 1998

[54] PLASTIC COATING MACHINE FOR JOINING TOGETHER PAPER AND CARDBOARD SHEETS WITH A TRANSPARENT FILM BY MEANS OF SOLVENT-FREE ADHESIVES

[75] Inventor: Renzo Rossetti, Rome, Italy

[73] Assignee: Centroplast Sud S.R.L., Rome, Italy

[21] Appl. No.: 588,297

[22] Filed: Jan. 18, 1996

Related U.S. Application Data

[63] Continuation of Ser. No. 138,716, Oct. 18, 1993, abandoned, which is a continuation of Ser. No. 754,151, Sep. 3, 1993, abandoned, which is a continuation of Ser. No. 551,885, Jul. 12, 1990, abandoned.

[30] Foreign Application Priority Data

Feb. 19, 1990 [IT] Italy .................... 47649A/90

[51] Int. Cl.⁶ ............................................. B32B 31/04
[52] U.S. Cl. ..................... 156/164; 156/229; 156/324; 156/324.4; 156/494; 156/549; 156/555
[58] Field of Search ...................... 156/160, 163, 156/164, 291, 324, 331.7, 494, 495, 547, 548, 549, 550, 551, 552, 555, 502, 322, 325, 531, 229, 324.4; 226/195; 427/172, 208.2

[56] References Cited

U.S. PATENT DOCUMENTS

| | | | |
|---|---|---|---|
| 1,965,719 | 7/1934 | Nelson | 156/549 X |
| 2,128,739 | 8/1938 | Connor | 428/487 |
| 2,154,474 | 4/1939 | Scott | 156/583.1 |
| 3,086,904 | 4/1963 | Uhleen | 156/320 |
| 3,196,069 | 7/1965 | Froehlig | 156/547 |
| 3,318,749 | 5/1967 | Califano et al. | 156/549 X |
| 3,411,418 | 11/1968 | Seragnoli | 156/547 X |
| 3,840,419 | 10/1974 | DeKeyser et al. | 156/555 X |
| 3,930,930 | 1/1976 | DeKeyser et al. | 156/578 |
| 4,092,202 | 5/1978 | Bergk et al. | 156/331.7 |
| 4,096,018 | 6/1978 | Hardt | 156/381 |
| 4,450,024 | 5/1984 | Haghiri-Tehrani et al. | 156/324.4 X |
| 4,464,220 | 8/1984 | Beer | 156/555 X |
| 4,594,125 | 6/1986 | Watson | 156/516 |
| 4,666,550 | 5/1987 | Spiers et al. | 156/361 |
| 4,704,171 | 11/1987 | Thompson et al. | 156/361 |
| 4,722,489 | 2/1988 | Wommer | 156/502 X |
| 4,883,694 | 11/1989 | Ramalingam | 156/331.7 X |
| 5,507,906 | 4/1996 | Woods et al. | 156/271 |

FOREIGN PATENT DOCUMENTS

| | | | |
|---|---|---|---|
| 0093385 | 1/1985 | European Pat. Off. | |
| 2125189 | 9/1972 | France . | |
| 1194562 | 6/1965 | Germany | 156/547 |
| 2350617 | 4/1975 | Germany | 427/208.2 |
| 2920328 | 11/1980 | Germany . | |
| 2928129 | 2/1981 | Germany . | |
| 3315815 | 11/1984 | Germany | 156/556 |
| 1221690 | 10/1987 | Italy . | |
| 46-16831 | 5/1971 | Japan | 427/208.2 |
| 58-59812 | 4/1983 | Japan . | |
| 58-67413 | 4/1983 | Japan | 156/547 |

OTHER PUBLICATIONS

Patent Abstracts of Japan, vol. 7, No. 145 (M–224) (1290) 24 Jun. 1983–Abstract JP-A-58 059 812 (Sumitomo Jukikai) 9 Apr. 1983.

World Patent Index Latest, Derwent Publications, Ltd., London referencing: GB AN 83–44756K (20), DW 8320 and JP-A-58059056 (Toyo Inc. Mfg.), 7 Apr. 1983.

*Primary Examiner*—James Sells
*Attorney, Agent, or Firm*—Thomas R. Vigil

[57] ABSTRACT

A plastic coating machine comprising means for continuously delivering the transparent film to be applied to the paper material support, a set of application rollers intended for spreading a thin layer of a solvent-free adhesive onto one side of said film, a pair of synchronized pressure rollers that carry out the operation of uniting said film with said paper material which is supplied by an automatic feeder or any other feeding system, a reel that picks up the plastic coated material, and means for adjusting the film tension over its whole path from said spreading group to the joining rollers.

11 Claims, 1 Drawing Sheet

PLASTIC COATING MACHINE FOR JOINING TOGETHER PAPER AND CARDBOARD SHEETS WITH A TRANSPARENT FILM BY MEANS OF SOLVENT-FREE ADHESIVES

This is a continuation of application Ser. No. 08/138,716 filed on Oct. 18, 1993 abandoned which is a continuation of application Ser. No. 07/754,151 filed Sep. 3, 1991 abandoned which is a continuation of application Ser. No. 07/551,885 filed Jul. 12, 1990 abandoned.

This invention relates to the field of paper industry and more exactly it refers to a machine for carrying out automatically the application of a transparent film, which is generally made up of polypropylene, to one side or to both sides of a papery support (i.e., paper or cardboard) which is in the form of separate sheets or of a continuous web.

The operation mentioned above, which is well known to those who are skilled in the art as "plastic coating", is widely employed in various fields, and above all in the field of the publishing industry and in paper industry, as for instance in the field of production of dust-jackets for books, journal covers, pamphlets and advertising booklets, notebook covers, perfume and drug cases and boxes, packings and package materials in general.

The wide spreading of the plastic coating techniques is mainly due to the improvement which is so obtained in the aesthetic and the functional characteristics of the paper material so treated, such as its brightness, its resistance to dampness, to tearing and to creasing.

According to the present state of the art, the plastic coating technique is performed as a rule by means of a clear or transparent protective film (made up of polypropylene or any other technologically suitable compound) which is coated with a thin layer of an adhesive which is to be activated by means of a solvent (ethyl acetate, toluene and so on).

The solvents mentioned above involve a double dangerous aspect owing to their toxic nature as well as to their high inflammability. Once their task of diluting the adhesive is completed, said solvents are to be evaporated off, and then they are to be expelled through suction systems which are to be equipped with suitable absorption, depuration and/or filtering means in order to avoid atmospheric pollution.

For the drying process, the film spread with the adhesive and the solvents is passed, before joining the same together with the paper support, through a heated and ventilated tunnel. Obviously, the production of hot air and the suction of smokes and vapours produced gives rise to a notable increase in the production costs, apart from the hard and costly fulfilments of the requirements to obtain the necessary clearance by the authorities entrusted with sanitary tasks and with fire-preventing services.

The object of the invention consists in the realization of a machine that allows all drawbacks mentioned above to be removed by means of the employment of a solvent-free adhesive.

According to the present invention, a machine is provided which comprises, in combination, a reel for delivering the transparent film, a spreading assembly intended for applying a thin homogeneous layer of a solvent-free adhesive to a side of said film, a pair of pressure rollers between which the operation is carried out of joining together said film bearing the adhesive so spread and the paper support, and means for surely obtaining the correct pulling action or tension on said film over its whole path from said spreading assembly to the joining step.

Said means for the adjustment of the pulling or tension action on the film consist of oscillating rollers (dandy rollers) which are borne by a support endowed with a pendulum-like oscillation and controlled by a hydraulic or a pneumatic piston.

Said dandy rollers are preferably arranged near the reel which delivers the film, upstream said spreading assembly and immediately before said joining rollers.

Figure 1:
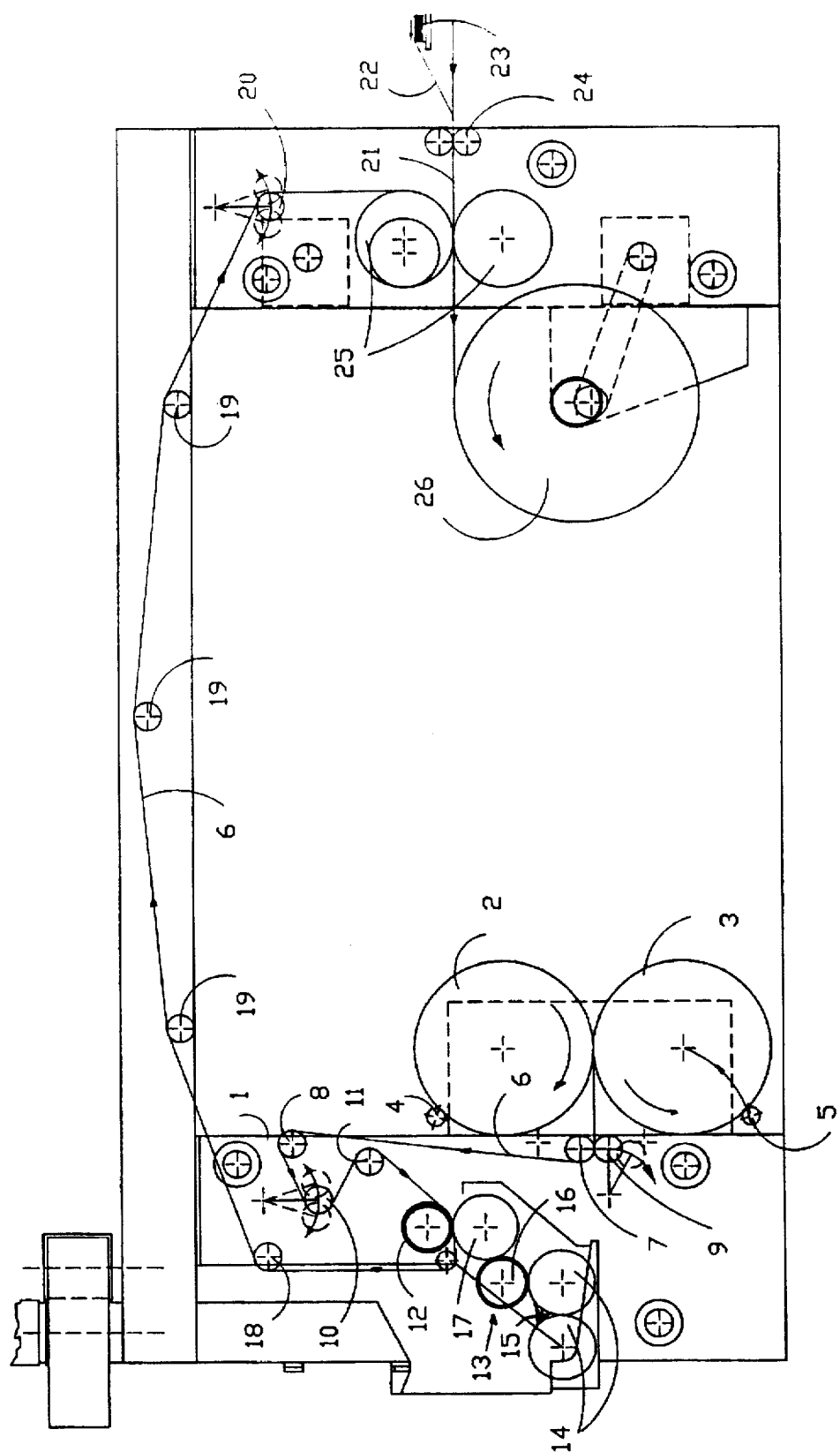
FIG. 1 is a longitudinal cross-sectional view of the apparatus of the present invention.

The invention will be disclosed in the following with reference to the only drawing enclosed, which illustrates in a schematic way and just for exemplification and not for limitative purposes a longitudinal cross-sectional view of the apparatus in question.

With reference to said drawing, the numeral 1 points out the whole framework of the machine, on which a pair of reels 2 and 3 bearing the transparent film is assembled in a rotatable way.

Said reels 2 and 3 are substituted periodically in succession so that the machine is not to be stopped when one of them becomes exhausted. To that aim, the feeler rollers 4 and 5 follow the progressive unwinding of the reels themselves.

The film pointed out by the reference numeral 6, passes over the transmission rollers 7 and 8, the first of which is associated to a tension roller 9, and then it passes over the second tension roller 10 (dandy roller) and afterwards the film, after passing over a further guiding roller 11, passes below a rubber-coated pressure roller 12 that is a part of an adhesive-spreading assembly pointed out by the reference numeral 13 and which is the object of another Italian patent and commercially available.

The spreading assembly 13 (which can be of the type disclosed in Italian Patent 1,221,690 issued to NORDMECCANIC SA) comprises a pair of heated rollers 14 between which the adhesive 15 is placed, said adhesive being of the solvent-free kind. Preferably, the adhesive 15 is a polyurethane adhesive of the single-component type (as for instance PURBINDER M/50), which is able to become crosslinked by the action of environmental dampness. The temperature of the adhesive and then of the rollers 14 is of about 55° C. Said adhesive 15, drawn by the twin rollers 14 is transferred to the rubber-coated roller 16 and therefrom the application roller 17 whose surface is specular, which roller applies the adhesive to the film 6 in the form of a thin homogeneous layer. Said rubber-coated roller 16 is interchangeable according to the width of the film 6.

After passing over said application roller 17, the film passes over the guiding and transmission rollers 18 and 19, after which it passes over a further dandy roller 20 similar to the roller 10 already mentioned above, and it arrives at the joining zone which is provided in the right part of the machine.

The paper material to be treated, pointed out by the reference numeral 21, comes from an inclined plane 22 which is associated with an automatic feeder 23 not shown in detail as it is of standard features.

The paper support, already printed, passes from said inclined plane 22 through the guiding rollers 24 and comes to the joining step which is carried out at the point corresponding to the twin rollers 25. A winding or pick-up reel 26 is arranged downstream of said twin rollers, on which reel the succession of sheets, which overlap just for a very short length along their transverse edges and are continuously coated with the transparent film, is wound. Such very short length of overlapping allows the adhesive-bearing film to avoid contact with the lower joining-roller.

The paper material which is plastic coated on one side, picked up by the reel 26, can next be divided into sheets which are conveyed to another equal processing for the application of the protective transparent film to the other side.

It is evident from the above that the machine according to this invention allows numerous advantages to be obtained, among which:

1. lower costs and less space occupied due to the elimination of the drying tunnel as well as of the suction devices associated with the same.

2. No need for boilers to obtain the drying hot air.

3. Higher throughput of the machine, as the adhesive is of immediate action, and lower amount of such adhesive per unit of surface to be treated.

This invention has been illustrated and disclosed according to a preferred embodiment of the same, but it is to be understood that construction variants can be introduced in the same by those who are skilled in the art without departing from the spirit and scope of the invention for which a priority right is claimed.

I claim:

1. A method for uniting separate material sheets of paper or cardboard material or a continuous web of paper material with a transparent or clear protective film in a plastic coating machine comprising:

(a) supplying a continuous film from a roll of film;
   (b) tensioning said film;
   (c) applying a solvent-free adhesive comprising a polyurethane compound of the single component type onto only one side of said film under tension by an adhesive spreading assembly;
   (d) establishing a long, generally horizontal flight path with a plurality of transmission rollers that is sufficiently long to dry partially said adhesive on said film to a desired tackiness without the use of hot air while said film is moved at a high speed over said transmission rollers;
   (e) guiding and moving said adhesive treated film at a high speed over said long flight path while partially drying said adhesive on said film without the use of hot air to a desired tackiness of the adhesive where it will immediately grip the paper or cardboard material to which it is to be laminated without slippage therebetween;
   (f) tensioning said film after said film exits said flight path; and,
   (g) feeding said tensioned adhesive tacky film to a pair of compression rollers and joining said film together with said paper or cardboard material by said pair of compression rollers.

2. The method of claim 1 including the step of controlling the temperature at which the adhesive is applied to the film at about 55° C.

3. A plastic coating machine for uniting, with separate sheets of paper or cardboard material or with a continuous web of paper material, a transparent or clear protective film, said machine comprising:

film supply means;
   guide roller means for receiving and guiding film from said supply means;
   first film tensioning means;
   an adhesive spreading assembly including a source of solvent-free adhesive comprising a polyurethane compound of the single component type and roller spreading means constructed and arranged to apply a layer of solvent-free adhesive from said source of adhesive onto only one side of said film guided thereto by said first tensioning means;
   means for partially drying said adhesive treated film exiting from said adhesive spreading assembly without the use of hot air including spaced apart transmission rollers for establishing a long, generally horizontal flight path of sufficient length to effect partial drying of said adhesive treated film to a desired tackiness of the adhesive where it will immediately grip the paper or cardboard material to which it is to be laminated without slippage therebetween, said drying of said adhesive treated film taking place while said adhesive treated film is travelling at a high speed on said long flight path from said spreading assembly;
   second tensioning means for receiving said adhesive tacky film from said flight guide means; and,
   a pair of compression rollers having the function of joining said film received from said second tensioning means together with said paper or cardboard material.

4. A plastic coating machine according to claim 1 wherein said spreading assembly is positioned and arranged immediately downstream of said film supply means [and in that said spreading assembly is made up of a set of rollers that apply a homogeneous and continuous adhesive layer onto said film.

5. A plastic coating machine according to claim 1 wherein said adhesive spreading assembly comprises means for applying said solvent free adhesive at a temperature of about 55° C.

6. A machine according to claim i, wherein said first and second tensioning means for adjusting tension of the continuous tape of film each comprise a tensioning roller which is mounted on an axle that can move arcuately in a pendulum-like way and arcuate movement of each axle is controlled by an hydraulic or pneumatic cylinder.

7. A machine according to claim 6 wherein said first tensioning roller for adjusting the tension on the film arranged near said film supply means at a position upstream of the spreading assembly, and upstream of the uniting rollers.

8. A machine according to claim 1 wherein said film supply means include a pair of reels of film which are employed alternately in succession.

9. A machine according to claim 1 further including an automatic feeder for sheets of paper and a support for the sheets of paper including an inclined plane which is placed near said pair of compression rollers for the joining operation, said inclined plane cooperating with said automatic feeder.

10. A machine according to claim 1 wherein the plastic coated paper material that comes out of the compression rollers is wound or picked up onto a pick-up reel placed at a position close to said compression rollers.

11. A plastic coating machine according to claim 6 wherein said second tensioning roller for adjusting the tension on the film is arranged near said compression rollers at a position upstream of said compression rollers.

* * * * *